United States Patent
Garceran (10) Patent No.: US 10,345,471 B2
(45) Date of Patent: Jul. 9, 2019

(54) METHODS AND APPARATUS FOR APPLYING SURFACE CONSISTENT PHASE-DEPENDENT PHASE CORRECTIONS

(71) Applicant: CGG SERVICES SA, Massy (FR)

(72) Inventor: Katia Garceran, Saint Cheron (FR)

(73) Assignee: CGG SERVICES SA, Massy (FR)

( * ) Notice: Subject to any disclaimer, the term of this patent is extended or adjusted under 35 U.S.C. 154(b) by 353 days.

(21) Appl. No.: 15/110,833

(22) PCT Filed: Jan. 13, 2015

(86) PCT No.: PCT/IB2015/000237
§ 371 (c)(1),
(2) Date: Jul. 11, 2016

(87) PCT Pub. No.: WO2015/104641
PCT Pub. Date: Jul. 16, 2015

(65) Prior Publication Data
US 2016/0334529 A1   Nov. 17, 2016

Related U.S. Application Data

(60) Provisional application No. 61/926,425, filed on Jan. 13, 2014.

(51) Int. Cl.
*G01V 1/36* (2006.01)

(52) U.S. Cl.
CPC .............. *G01V 1/364* (2013.01); *G01V 1/366* (2013.01); *G01V 2210/582* (2013.01)

(58) Field of Classification Search
CPC ... G01V 1/364; G01V 1/366; G01V 2210/582
See application file for complete search history.

(56) References Cited

U.S. PATENT DOCUMENTS 5,764,516 A * 6/1998 Thompson ............. G01V 1/362
367/54

FOREIGN PATENT DOCUMENTS

GB          2254146 A       9/1992

OTHER PUBLICATIONS

International Search Report in related International Application No. PCT/IB2015/000237, dated Jul. 6, 2015.
Written Opinion of the International Searching Authority in related International Application No. PCT/IB2015/000237, dated Jul. 6, 2015.
R. Calvert et al., "Mixed Phase Surface Consistent Deconvolution Without Phase Unwrapping", EAGE 63rd Conference & Technical Exhibition, Amsterdam, The Netherlands, Jun. 11-15, 2001, pp. 1-4.
H. Foroosh et al., "Extension of Phase Correlation to Subpixel Registration", IEEE Transactions on Image Processing, Mar. 2002, vol. 11, No. 3, pp. 188-200.
J. Ronen et al., "Surface-Consistent Residual Statics Estimation by Stack-Power Maximization", Geophysics, Dec. 1985, vol. 50, No. 12, pp. 2759-2767.

(Continued)

*Primary Examiner* — Kyle R Quigley
(74) *Attorney, Agent, or Firm* — Patent Portfolio Builders PLLC (57) ABSTRACT

Methods and apparatuses compute and apply surface-consistent frequency-dependent phase corrections, to traces extracted from seismic survey data, using a multi-scale iterative approach.

16 Claims, 6 Drawing Sheets

(56) References Cited

OTHER PUBLICATIONS

A.T. Walden, "Estimated Cross Spectrum Matrices and their Inverses", Dept. of Mathematics, Imperial College of Science, Technology and Medicine, Imperial College, Dec. 17, 1997, pp. 1-17.

* cited by examiner

Fig. 7 ga : STACK trace    gb : Common CMP traces

METHODS AND APPARATUS FOR APPLYING SURFACE CONSISTENT PHASE-DEPENDENT PHASE CORRECTIONS

CROSS REFERENCE TO RELATED APPLICATIONS

This application claims priority and benefit from U.S. Provisional Patent Application No. 61/926,425, filed Jan. 13, 2014, for "Surface Consistent Residual Phase Corrections" the entire contents of which is incorporated in its entirety herein by reference.

BACKGROUND

Technical Field

Embodiments of the subject matter disclosed herein generally relate to seismic data processing or, more specifically, to applying surface-consistent frequency-dependent phase corrections.

Discussion of the Background

In geophysical prospecting, gas and oil reservoirs are sought by performing seismic surveys of underground formations. Trajectory of waves injected in the explored formation is affected by variations of seismic wave propagation velocity from one layer to another. At layers interfaces, the waves may be reflected, refracted and/or transmitted. The waves emerging from the formation are detected by seismic receivers. Seismic surveys are performed on land and in water.

The near surface variations cause time delays and frequency dependent phase distortions in the detected waves. These alterations (i.e., the time delays and the frequency dependent phase distortion) undesirably corrupt the sought underground structural information.

Conventionally, the time shifts have been corrected by fitting a surface consistent model to time anomalies of a particular event on various traces:

$$\Delta t_i = S(s_i) + G(g_i) + Y(y_i) + R(y_i) h_i^2 \quad (1)$$

where $\Delta t_i$ is the time anomaly for a trace resulting from a shot $s_i$ and detected by receiver $g_i$, corresponding to midpoint $y_i = (s_i + g_i)/2$, and a shot-receiver offset $h_i = (s_i - g_i)/2$, S and G are shot and receiver corrections, Y is a structure term and R is a residual normal-moveout (NMO) correction. The time anomalies (used to determine functions S, G, Y and R) may be picked using cross-correlation maxima. However, this non-linear method of picking maxima is susceptible to failure in the presence of ambiguity or noise. Alternatively or additionally, another method (described in the article "Surface-consistent residual statics by stack power maximization" by J. Ronen and J. F. Claerbout, published in Geophysics 50, No. 12, 1985, pp 2,759-2,767, the entire content of which is incorporated herein by reference) seeks maximization of the stack-power. In this approach, the time shift corresponds to a linear phase with null intercept in the frequency domain.

Conventional methods (as described in the article "Mixed phase surface consistent deconvolution without phase unwrapping" by R. Calvert and C. Perkins, published in proceeding of EAGE 63RD Conference & Technical Exhibition, 2001, the entire content of which is incorporated herein by reference) assume a minimum phase input or require phase unwrapping. The assumption is not necessarily correct and the phase unwrapping is complex and susceptible to introduce errors.

Since correction of the time and phase distortions caused by near-surface variations are a prerequisite for inversion and 4-D analysis (i.e., comparing seismic datasets acquired for the same area at time intervals large enough to make possible observing substantive changes inside the surveyed formation), it is desirable to develop methods able to make more accurate surface related corrections, while mitigating the above-identified drawbacks of the conventional methods.

SUMMARY

Surface-consistent phase-dependent corrections according to various embodiments increase traces energy, removing anomalies due to local variations induced by an inhomogeneous surface layer.

According to an embodiment, there is a method for applying surface consistent phase corrections to a group of traces extracted from seismic survey data. The method includes computing frequency dependent phase filters associated with frequency windows, for traces corresponding to a shot or to a receiver. The computing is performed using a reference trace that is substantially free of phase shifts, and overlapping frequency windows with different bandwidths for at least one frequency range. The method further includes applying the computed phase filters to the traces.

According to another embodiment there is an apparatus configured to apply surface consistent phase corrections to traces extracted from seismic survey data. The apparatus has an interface to receive the seismic survey data, and to output or store the seismic survey data after the surface consistent phase corrections are applied, for further processing leading to an image of a surveyed formation. The apparatus also has a data processing unit including at least one processor and configured to compute frequency dependent phase filters associated with frequency windows, for traces corresponding to a shot point or to a receiver, using a reference trace that is substantially free of phase anomalies. The at least one processor uses overlapping frequency windows with different bandwidths for at least one frequency range. Further the at least one processor is configured to apply the computed phase filters to the traces.

According to yet another embodiment, there is a non-transitory computer readable recording medium storing executable codes which when executed by a computer, make the computer perform a method for applying surface consistent frequency dependent phase corrections to traces extracted from seismic survey data. The method includes computing frequency dependent phase filters associated with frequency windows, for traces corresponding to a shot or to a receiver, using a reference trace that is substantially free of phase shifts, overlapping frequency windows with different bandwidths being used for at least one frequency range. The method further includes applying the computed phase filters to the traces.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5 A-D illustrate combining phases obtained during separate series of iterations;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to land seismic data. However, similar problems may occur for a marine seismic survey data or for survey data acquired using electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Some embodiments described hereinafter determine and apply surface consistent phase corrections using a multi-scale iterative approach. The term "multi-scale" refers to using frequency windows having different widths to determine phase corrections. For each window width, the phase correction (i.e., computing frequency phase filters) is performed iteratively until, for example, applying the computed frequency filters no longer significantly increases power of the target traces (e.g., the traces in a Common Mid-Point Stack, CMS).

Figure 1:
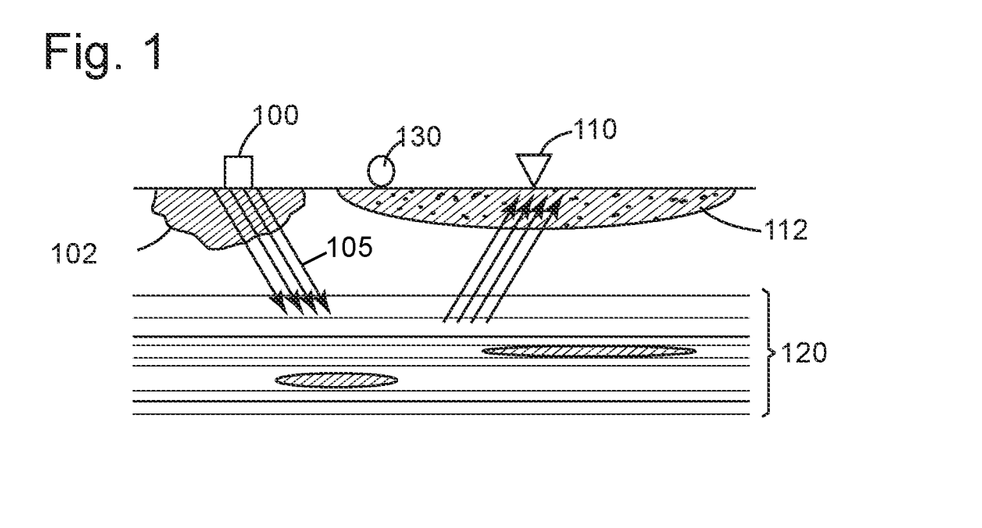
FIG. 1 illustrates a land seismic survey data setup.

FIG. 1 illustrates a land seismic survey data setup. Seismic waves 105 are emitted by a source 100 (e.g., one or more vibrators) and detected by a receiver 110 (e.g., hydrophone geophone, etc.) after traveling through the surveyed formation 120. In the layer formation layer closest to the surface (known as the weathering layer), local variations (e.g., of humidity, porosity, composition, etc.) may cause time delays and phase shifts. Regions 102 and 112 in vicinity of source 100 and receiver 110, respectively, suggest these local variations. The local variations create not only time delays, but also a frequency-dependent phase distortion.

Traces corresponding to waves emitted from the source 100's position and detected at the receiver 110's position may be associated with a mid-point bin position 130. A trace is a series of signal amplitude and time (corresponding to depth) pairs of values. Other traces corresponding to other shot positions and other receiver positions than the source 100's position and receiver 110's position may also be associated with the mid-point bin position 130, to form a Common Mid-Point Stack (CMS). In an average CMS trace, the phase anomalies are substantially attenuated and, therefore, the trace may be considered free from the phase anomalies.

For a group of traces, signals are distorted in phase by frequency dependent phase shifts ($\Delta\varphi_{i,f0}$, $\Delta\varphi_{i,f1}$, ..., $\Delta\varphi_{i,fmax}$), where i=1, ..., No_shots+No_receivers, for frequencies between a base frequency $f_0$ and a last considered frequency $f_{max}$ (that may be Nyquist frequency $f_{NYQ}$, which is determined by the sampling frequency or less, e.g., the maximum frequency of the emitted seismic waves).

To correct for the frequency-dependent phase shifts due to top layer local effects, traces of waves traveling from or to a location are compared with a reference trace that is considered free from the phase anomalies. For example, the reference trace may be an average CMS trace.

In some embodiments, the comparison used to determine the frequency-dependent phase shifts is based on a cross-spectrum. Unlike conventional methods, the cross-spectrum and associated techniques (e.g., using variable bandwidth windows and/or averaging over N sub-blocks) are used to compute surface consistent phase shifts.

Figure 2:
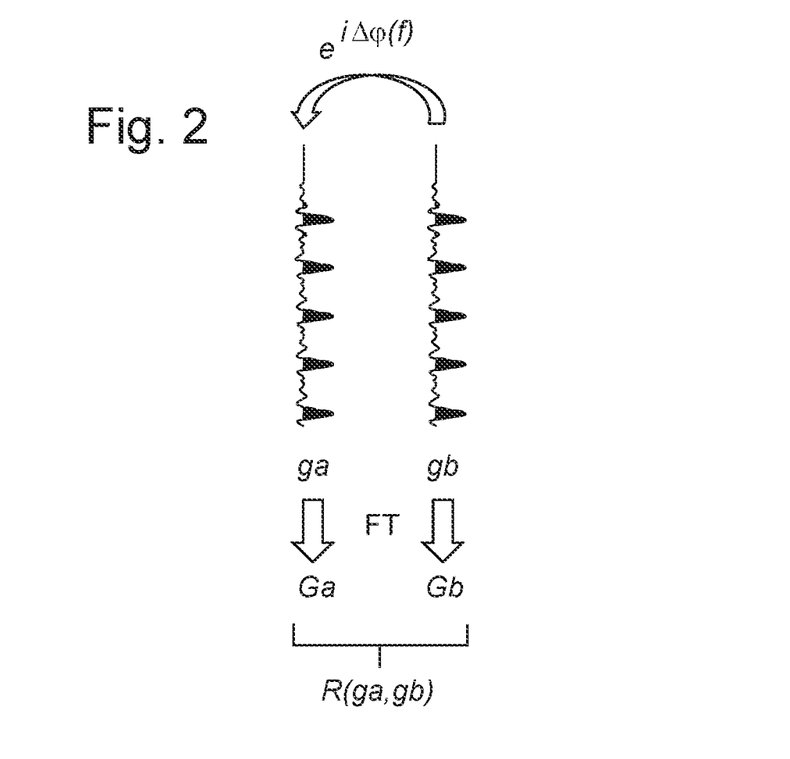
FIG. 2 illustrates calculating cross-spectrum for two traces.

As schematically illustrated in FIG. 2, to calculate the cross-spectrum, two traces ga (the reference trace) and gb (a trace including frequency-dependent phase shifts) are first transformed in the frequency domain using, e.g., the Fourier transform, to obtain Ga and Gb. The cross-spectrum R, is calculated as:

$$R(ga,gb)(f) = Ga(f) \cdot Gb^*(f)$$

where f is frequency, * indicates complex conjugate, and · is the Hadamard product.

The normalized cross-spectrum yields a phase only operator (i.e., a phase filter) $e^{i(\Delta\varphi(f))}$ that, when applied to gb, makes gb match phase-wise ga:

$$\frac{R(ga, gb)(f)}{|R(ga, gb)(f)|} = e^{i(\varphi a(f) - \varphi b(f))} = e^{i(\Delta\varphi(f))},$$

$\Delta\varphi(f)$ being a relative phase between trace gb and reference trace ga. This normalized cross-spectrum is not sensitive relative to amplitudes and provides a confident estimation of the relative phase. A weighted overlapped segment averaged estimator method may be used to calculate the cross-spectrum. On a side note, a measure of the linear relationship between the two traces at frequency f is $C_{ab}(f) = |R(ga,gb)(f)|$ which takes values between 0 and 1.

Figure 3:
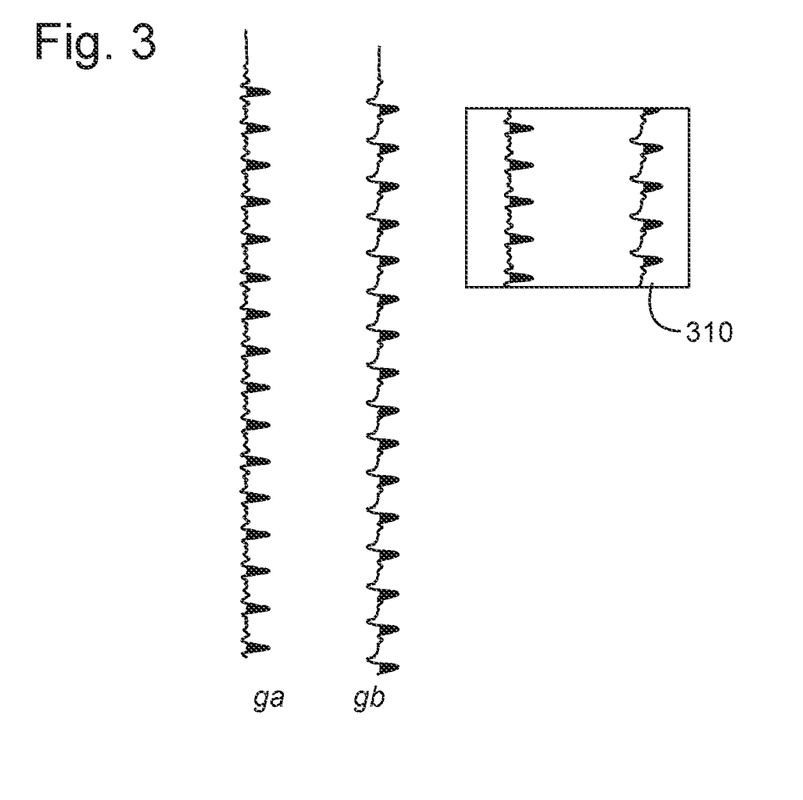
FIG. 3 illustrates a temporal block used for calculating cross-spectrum.

Some embodiments average the cross-spectrum calculated in two or more temporal sub-blocks along the traces (such as sub-block 310 of traces ga and gb illustrated in FIG. 3) in order to get a more confident estimation of the trace's relative phase $\Delta\varphi(f)$.

Figure 4:
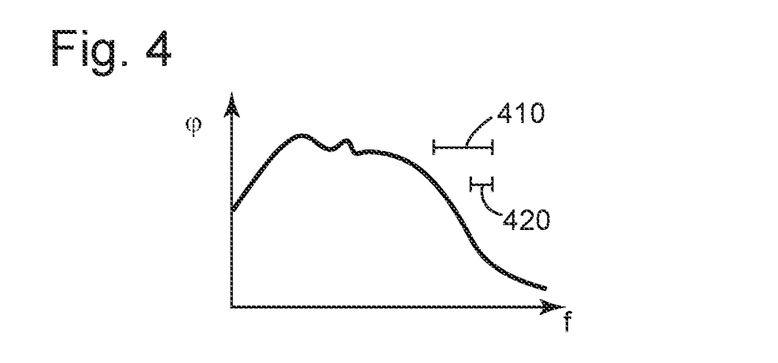
FIG. 4 is a graph of phase versus frequency.

Focusing now on the frequency windows, FIG. 4 is a graph illustrating phase dependence of frequency. Analysis bandwidth 410 is a first frequency window used for calculating the phase corrections, and analysis bandwidth 420 is a second frequency window used for calculating the phase corrections. The larger the bandwidth (e.g., 410) the smoother are the phase variations, but narrower bandwidth (e.g., 420) the better abrupt variations are revealed.

Figure 5A:
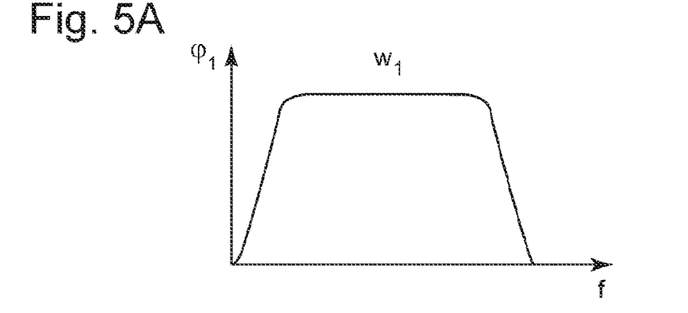
Figure 5B:
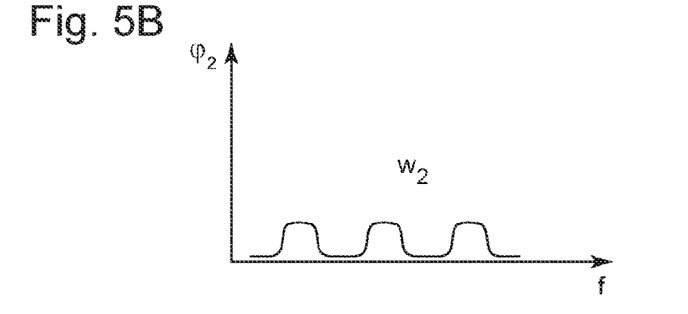
Figure 5C:
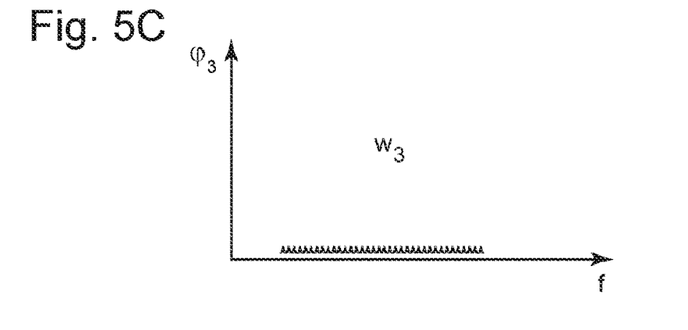
Figure 5D:
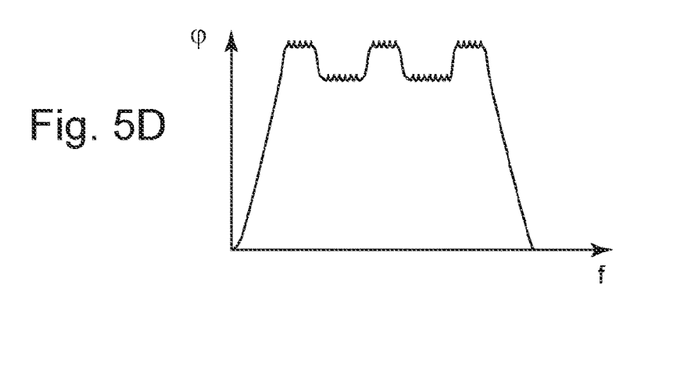

An average phase shift $\varphi_1$ (as illustrated in FIG. 5A) is determined using a frequency window covering the frequency range of the emitted waves. A frequency-dependent phase shift $\varphi_2$ (as illustrated in FIG. 5B) may be determined using few frequency windows spanning the frequency range. Another frequency-dependent phase shift $\varphi_3$ (as illustrated in FIG. 5C) may be determined using many narrow frequency windows. FIG. 5D illustrates a combination (e.g., a sum) of the different phase shifts ($\varphi_1$, $\varphi_2$, $\varphi_3$), each of the frequency-dependent shifts having a different scale/resolution along the frequency axis.

Figure 6:
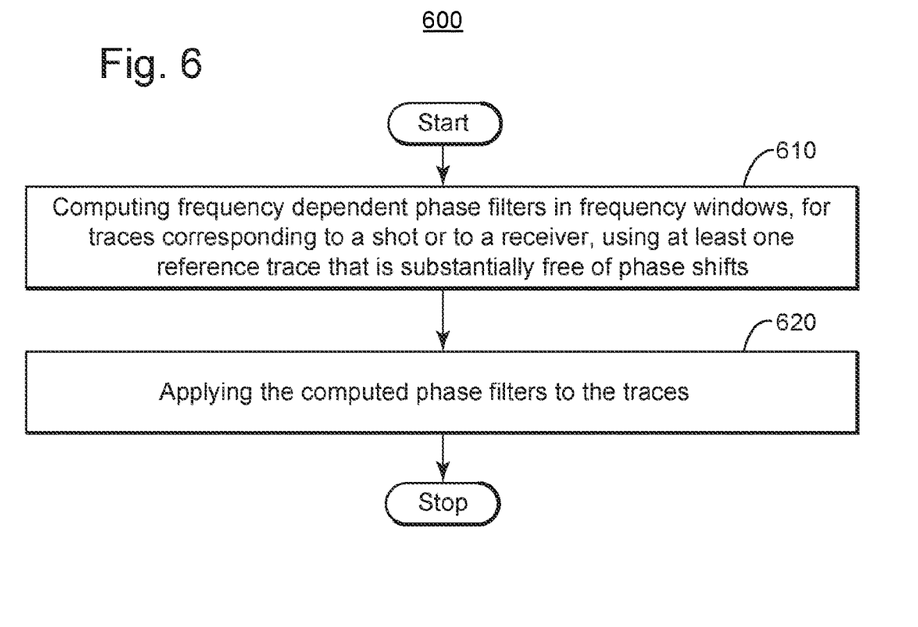
FIG. 6 is a flowchart of a method according to an embodiment.

FIG. 6 is a flowchart of a method 600 for applying surface consistent phase corrections to a group of traces extracted from seismic survey data. At 610, method 600 includes computing frequency dependent phase filters (based on the phase shifts) associated with frequency windows (e.g., frequency widows having the same width and spanning the relevant frequency range), for traces corresponding to a shot or to a receiver, using a reference trace that is substantially free of phase shifts.

At 620, method 600 includes applying the computed phase filters to the traces (i.e., correcting the phase shifts). The sum of phase filters computed from traces of a shot i and their corresponding CMP stacks gives the phase filter (i.e., phase correction) to apply to traces related shot i, assuming that the summation cancels the phase distortions associated to the receivers. Conversely, the sum of phase filters computed from traces of a receiver i and their corresponding CMP stacks gives the phase filter (i.e., phase correction) to apply to traces related receiver i, assuming that the summation cancels the phase distortions associated to the shots.

Figure 7:
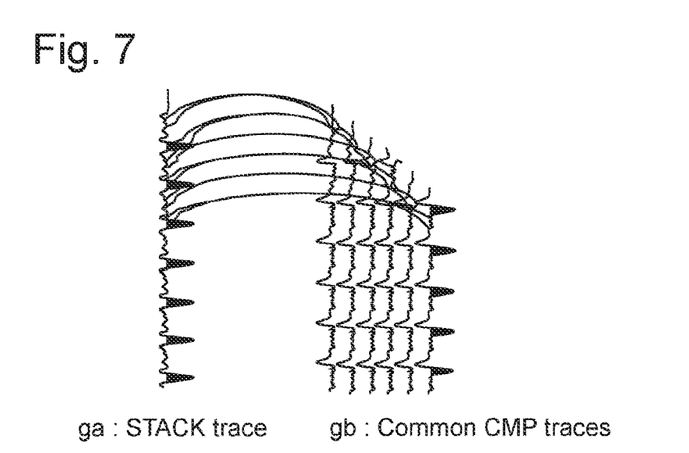
FIG. 7 illustrates calculating cross-spectra for a reference trace and plural selected traces from different shots to the same receiver or to different receivers from the same shot.

The frequency dependent phase filters may be obtained based on phase differences obtained from a frequency domain cross-spectrum of the traces corresponding to the shot or to the receiver, and the reference trace. FIG. 7 schematically illustrates phase shifts determined between a representative trace $g_a$ (e.g., a STACK representative trace) and plural traces $g_b$ (e.g., common mid-point, CMP, traces) corresponding to some shots or to some receivers. The phase differences obtained for the plural traces may then be averaged. By focusing on traces for the same shot, the frequency dependent phase shifts caused by the conditions around the shot position (e.g., region 102 in FIG. 1) are determined. Similarly, by focusing on traces for the receiver, the frequency dependent phase shifts caused by the conditions around the receiver position (e.g., region 112 in FIG. 1) are determined.

The frequency dependent phase filters may be based on an average of the phase differences obtained for at least two different temporal blocks along the traces. Method 600 may be performed for plural shots and/or receivers.

Multiple iterations of method 600 may be performed for the same analysis bandwidth (i.e., frequency windows width), if the difference between an initial energy of the traces before applying the phase filters and a final energy of the traces after applying the phase filters exceeds a predetermined threshold. The reference trace may be updated between iterations, using the phase corrected traces (i.e., after applying the phase filters). For example the average CMS track may be recalculated.

Figure 8:
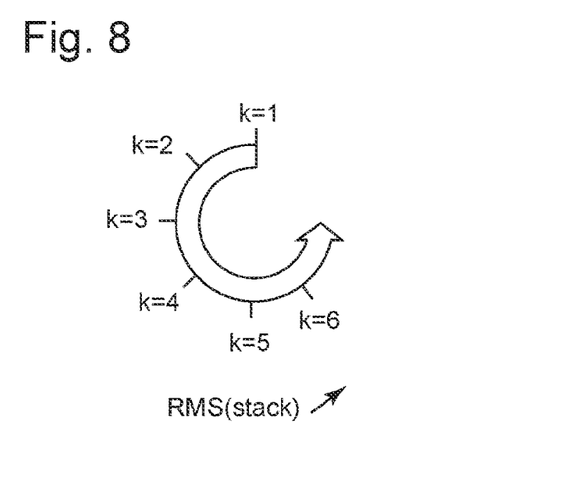
FIG. 8 illustrates a series of iterations for same frequency windows.

These multiple iterations for the same analysis bandwidth are schematically illustrated in FIG. 8. Initially (k=1) for a predefined set of frequency windows spanning the analyzed frequency range, the phase only filters are calculated and applied. The difference between traces' energy (e.g., calculated as RMS, which is proportional with the sum of the detected amplitude samples squared) after applying the filters and before applying the filters is calculated. As long as the difference exceeds a predetermined threshold (i.e., continues increasing), the method is performed again (i.e., k=2, k=3, . . . ) for updated traces and reference trace.

Figure 9:
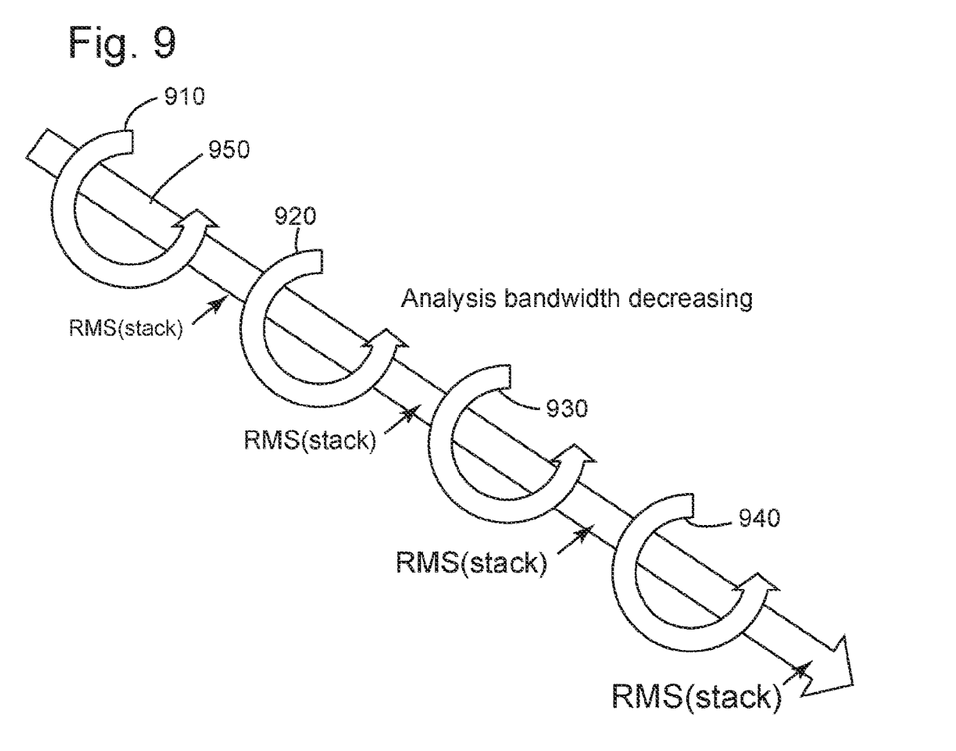
FIG. 9 illustrates series of iterations performed for different frequency windows, respectively.

Once the difference no longer exceeds the predetermined threshold, other frequency window width is used and the iterative process is performed for a new set of frequency windows, as illustrated in FIG. 9. Each curved arrow (910, 920, 930, 940) in FIG. 9 represents iterations performed for a particular frequency window width. The energy continuously increases as suggested by the increasing size of the "RMS (stack)" label. The same predetermined threshold may be used for each series of iterations (curved arrow). However, the thresholds used in different series of iterations (different curved arrows) may change. For example, the threshold may change according to a predetermined rule, such as, to be at least a predetermined fraction (e.g., 50%) from a previous threshold.

The sets of frequency windows may be any predefined set with windows of various bandwidths. The straight downwards pointing arrow 950 in FIG. 9 suggests the sequence of iterations. In some embodiments, the frequency windows may be substantially equal with one another. Here "substantially" means that they are equal to a degree at which the differences are insignificant for the purpose. For example, for a 20/3 Hz window, consecutive windows being different from one another up to ±0.001 Hz is not a difference that would impact the method's application. Further, in some embodiments, the substantially equal frequency windows used in later series of iterations may have a smaller bandwidth than the earlier iterations. For example, the analysis bandwidth for the series of iterations represented by curved arrow 910 is larger than the analysis bandwidth for the series of iterations represented by curved arrow 920, the analysis bandwidth for the series of iterations represented by curved arrow 920 is larger than the analysis bandwidth for the series of iterations represented by curved arrow 930, etc. Thus, along arrow 950, the scale in frequency varies.

The global phase only filter for a component (source or receiver) i, after N filter calculations can be written as:

$$F_i(f) = \Pi_{q=1,N} F_i^q(f)$$

where $F_i^q(f)$ is the phase filter computed at iteration q for the frequency f.

An embodiment of the method has been used for a synthetic 3D dataset altered to inject the following anomalies: (A) a constant phase rotation applied to some shots and receivers, (B) time shifts applied to some shots and receivers (i.e., a linear variation of phase with time), and (C) a sinusoidal variation of the phase with frequency for some shots and receivers. The above-described methods for applying surface consistent phase corrections successfully identified and corrected these anomalies.

A static correction method (that performs time shifts and/or frequency independent phase corrections) may be applied before applying the above described methods. Table 1 below summarizes the results. Flow A corresponds to applying the static correction method before applying an iterative multi-scale frequency dependent method on real 2D data (X,Time) for substantially equal frequency windows of 30 Hz, then 20 Hz, 15 Hz, 10 Hz, 5 Hz, 2 Hz. Flow B corresponds to applying directly an iterative multi-scale frequency dependent method on the same data and for the same windows. The values in table cells corresponding to one frequency window and Flow A or Flow B represent the energy (i.e., RMS) increase relative to the initial energy achieved after performing the series of iterations using the specified frequency window.

TABLE 1

| Frequency window | Flow A | Flow B |
|---|---|---|
| 30 Hz | 1% | 33.4% |
| 20 Hz | 1.1% | 38.8% |
| 15 Hz | 1.5% | 42.6% |
| 10 Hz | 2.6% | 48.2% |
| 5 Hz | 5.1% | 53.8% |
| 2 Hz | 8.8% | 59.2% |

The frequency dependent phase shifts obtained in Flow B is a sum of a linear term in frequency (which can be obtained directly using a static correction method) and the frequency dependent phase shifts obtained in Flow A. The results were essentially equivalent.

The above-described multi-scale iterative methods for surface consistent phase corrections are based on cross-spectral analysis, can use the full spectrum and there is no need to further unwrap the phase. The methods may also correct for time shifts. The methods yielded reliable results for both synthetic and real data, increasing the stack power. Upon applying such methods to real data, fine details have been recovered and an improved lateral stability has been observed.

Figure 10:
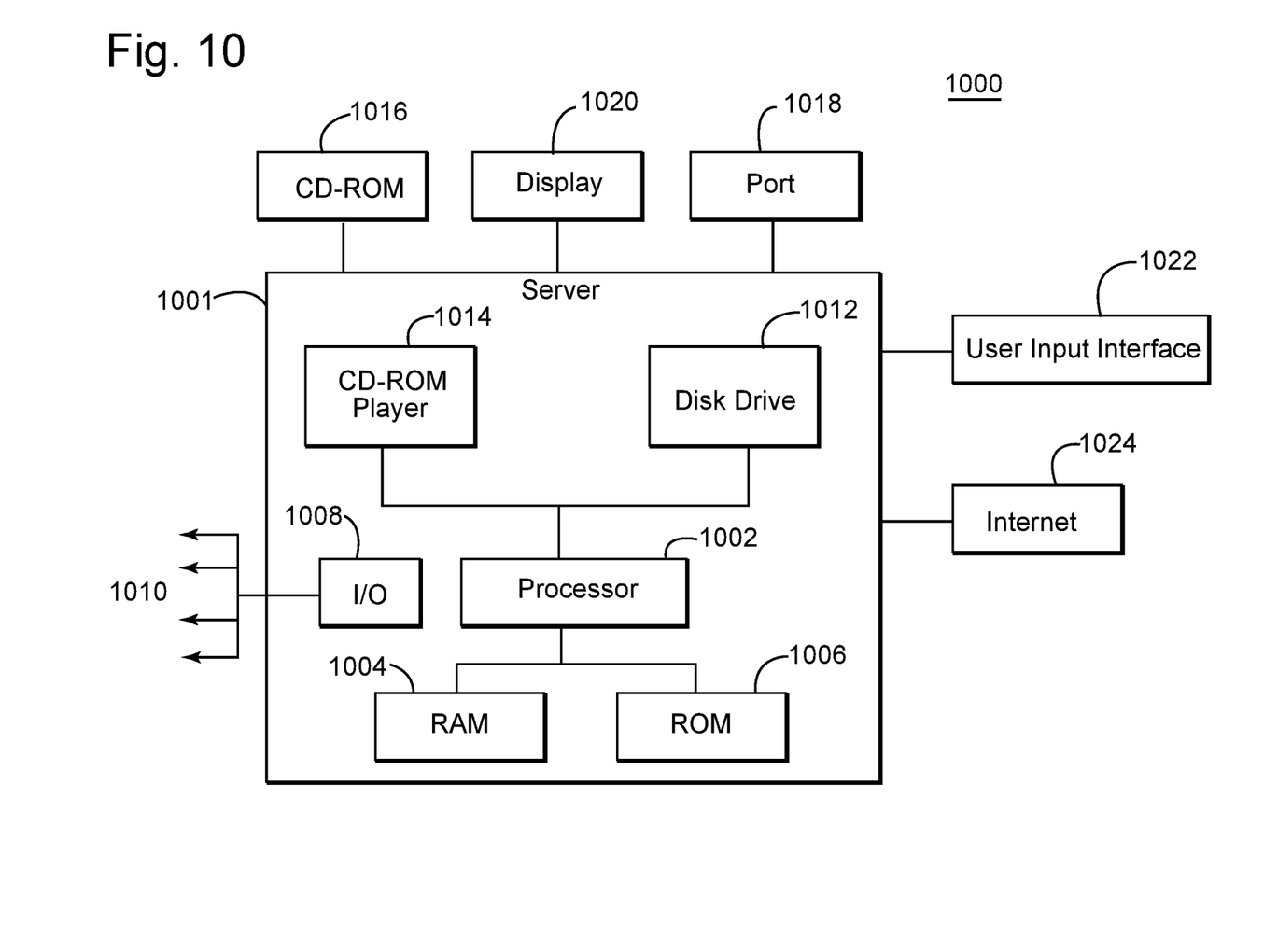
FIG. 10 is a schematic diagram of an apparatus according to an embodiment.

FIG. 10 illustrates a block diagram of a seismic data processing apparatus 1000 configured to perform multi-scale iterative methods according to an embodiment. Hardware, firmware, software or a combination thereof may be used to perform the various steps and operations. Apparatus 1000 may include server 1001 having a data processing unit (processor) 1002 coupled to a random access memory (RAM) 1004 and to a read-only memory (ROM) 1006. ROM 1006 may also be other types of storage media to store programs, such as programmable ROM (PROM), erasable PROM (EPROM), etc. The above-described methods applying surface consistent phase corrections according to various embodiments may be implemented as computer programs (i.e., executable codes) non-transitorily stored on RAM 1004 or ROM 1006.

Processor 1002 may communicate with other internal and external components through input/output (I/O) circuitry 1008 and bussing 1010. Input-output (I/O) interface 1008 is configured to receive the seismic survey data and to output or store the seismic survey data after the surface consistent phase corrections are applied, for further processing leading to an image of a surveyed formation.

Processor 1002 carries out a variety of functions as are known in the art, as dictated by software and/or firmware instructions. Processor 1002 is configured to compute frequency dependent phase filters for frequency windows, for traces corresponding to a shot point or to a receiver, using a reference trace that is substantially free of phase anomalies, and to apply the computed phase filters to the traces. Processor 1002 computes the frequency dependent phase filters using overlapping frequency windows with different bandwidths for at least one frequency range.

Server 1001 may also include one or more data storage devices, including disk drives 1012, CD-ROM drives 1014, and other hardware capable of reading and/or storing information, such as a DVD, etc. In one embodiment, software for carrying out the above-discussed methods may be stored and distributed on a CD-ROM 1016, removable media 1018 or other forms of media capable of storing information. The storage media may be inserted into, and read by, devices such as the CD-ROM drive 1014, disk drive 1012, etc. Server 1001 may be coupled to a display 1020, which may be any type of known display or presentation screen, such as LCD, plasma displays, cathode ray tubes (CRT), etc. Server 1001 may control display 1020 to exhibit images of the surveyed formation. A user input interface 1022 may include one or more user interface mechanisms such as a mouse, keyboard, microphone, touchpad, touch screen, voice-recognition system, etc.

Server 1001 may be coupled to other computing devices and may be part of a larger network configuration as in a global area network such as the Internet 1024.

The disclosed exemplary embodiments provide methods and apparatus for applying surface consistent phase corrections. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method applying surface consistent phase corrections to a group of traces extracted from seismic survey data, the method comprising:
  receiving seismic survey data acquired over a subsurface;
  computing frequency dependent phase filters associated with frequency windows, for traces extracted from the seismic survey data and corresponding to a shot or to a receiver, the frequency dependent phase filters being computed using at least one reference trace that is substantially free of phase shifts, and using overlapping frequency windows with different bandwidths for at least one frequency range;
  applying the computed phase filters to the traces, and
  recovering structural information related to the subsurface from the filtered traces
  wherein the method further comprises:
  as long as an energy difference between energy of the traces after applying the phase filters and energy of the traces before applying the phase filters exceeds a first threshold, repeatedly perform using same frequency windows spanning a frequency range;
  updating the at least one reference trace based on the traces after applying the phase filters, and
  performing the computing of the frequency dependent phase filters and the applying of the computed phase filters to the traces;
  changing a width the frequency windows to obtain new frequency windows, when the energy difference no longer exceeds the first threshold; and performing the computing of the frequency dependent filters for the new frequency windows, the applying of the computed phase filters, and the updating of the reference trace, as long as the energy difference exceeds a second threshold, wherein a phase correction for a frequency sub-range included in one of the frequency windows and in one of the new frequency windows is a sum of a first phase correction corresponding to the phase filters computed for the one of the frequency windows and a second phase correction corresponding to the phase filters computed for the one of the new frequency windows.

2. The method of claim 1, wherein, if a trace in the group of traces is part of a Common Mid-Point Stack, CMS, then an average CMS trace is used as the at least one reference trace.

3. The method of claim 1, wherein the frequency dependent phase filters are based on phase differences obtained from a frequency domain normalized cross-spectrum of the traces corresponding to the shot or to the receiver, and the at least one reference trace.

4. The method of claim 3, wherein the frequency dependent phase filters are based on an average of the phase differences obtained for at least two different temporal blocks.

5. The method of claim 1, wherein the computing of the frequency dependent filters, and the applying of the computed phase filters, are performed for plural shots and/or receivers.

6. The method of claim 1, wherein the second threshold is equal to the first threshold and the changed width is smaller than the width.

7. The method of claim 1, wherein, when the width is changed, the second threshold is determined using a predetermined threshold rule and/or the changed width is determined using a predetermined width changing rule.

8. The method of claim 1, wherein the changed width and/or the second threshold are determined from a predetermined list of widths and/or threshold values.

9. The method of claim 1, further comprising:
applying a method for static corrections before performing the computing of the frequency dependent phase filters for the first time.

10. An apparatus configured to apply surface consistent phase corrections to traces extracted from seismic survey data, the apparatus comprising:
an interface configured
to receive the seismic survey data acquired over a surveyed formation, and
to output or store the seismic survey data after the surface consistent phase corrections are applied, for further processing leading to an image of the surveyed formation; and
a data processing unit including at least one processor and configured
to compute frequency dependent phase filters associated with frequency windows, for traces extracted from the seismic survey data and corresponding to a shot point or to a receiver, the frequency dependent phase filters being computed using at least one reference trace that is substantially free of phase anomalies, and using overlapping frequency windows with different bandwidths for at least one frequency range, and
to apply the computed phase filters to the traces
wherein the data processing unit is further configured to perform repeatedly:
as long as a power difference between power of the traces before applying the computed phase filters and power of the traces after applying the computed phase filters exceeds a first threshold:
updating the at least one reference trace using the traces after applying the phase filters, and
computing the frequency dependent phase filters and apply the computed phase filters to the traces; and
the data processing unit is further configured to change the width of the frequency windows, when the power difference no longer exceeds the first threshold, and then to compute the frequency dependent filters associated with frequency windows having the changed width, apply the computed phase filters, and update the reference trace, as long as the power difference exceeds a second threshold.

11. The apparatus of claim 10, wherein if a trace in the group of traces is part of a Common Mid-Point Stack, CMS, then an average CMS trace is used as the at least one reference trace.

12. The apparatus of claim 10, wherein the data processing unit computes the frequency dependent phase filters based on phase differences obtained using a frequency domain normalized cross-spectrum of the traces corresponding to the shot or to the receiver, and the at least one reference trace, and/or the data processing unit averages the phase differences obtained using at least two different temporal blocks.

13. The apparatus of claim 10, wherein the data processing unit is further configured to compute the frequency dependent filters, and to apply the computed phase filters for plural shots and/or receivers.

14. The apparatus of claim 10, wherein the data processing unit is further configured:
to determine the second threshold using a predetermined threshold rule and/or the changed width using a predetermined width changing rule, or
to determine the changed width and/or the second threshold from a predetermined list of width and/or threshold values.

15. The apparatus of claim 10, wherein the data processing unit is further configured to apply a method for static corrections before computing of the frequency dependent phase filters.

16. A non-transitory computer readable recoding medium storing executable codes which, when executed by a computer, make the computer to perform a method for applying surface consistent frequency dependent phase corrections to traces extracted from seismic survey data, the method comprising:
receiving seismic survey data acquired over a subsurface;
computing frequency dependent phase filters associated with frequency windows, for traces extracted from the seismic survey data and corresponding to a shot or to a receiver, the frequency dependent phase filters being computed using at least one reference trace that is substantially free of phase shifts, and using overlapping frequency windows with different bandwidths for at least one frequency range;
applying the computed phase filters to the traces; and
recovering structural information related to the subsurface from the filtered traces wherein the method further comprises:
as long as an energy difference between energy of the traces after applying the phase filters and energy of the traces before applying the phase filters exceeds a first threshold, repeatedly perform using same frequency windows spanning a frequency range:
  updating the at least one reference trace based on the traces after applying the phase filters, and
  performing the computing of the frequency dependent phase filters and the applying of the computed phase filters to the traces;
changing a width the frequency windows to obtain new frequency windows, when the energy difference no longer exceeds the first threshold; and
performing the computing of the frequency dependent filters for the new frequency windows, the applying of the computed phase filters, and the updating of the reference trace, as long as the energy difference exceeds a second threshold,
wherein a phase correction for a frequency sub-range included in one of the frequency windows and in one of the new frequency windows is a sum of a first phase correction corresponding to the phase filters computed for the one of the frequency windows and a second phase correction corresponding to the phase filters computed for the one of the new frequency windows.

\* \* \* \* \*